No. 834,392. PATENTED OCT. 30, 1906.
G. A. MEAD.
STRAIN INSULATOR.
APPLICATION FILED APR. 22, 1905.
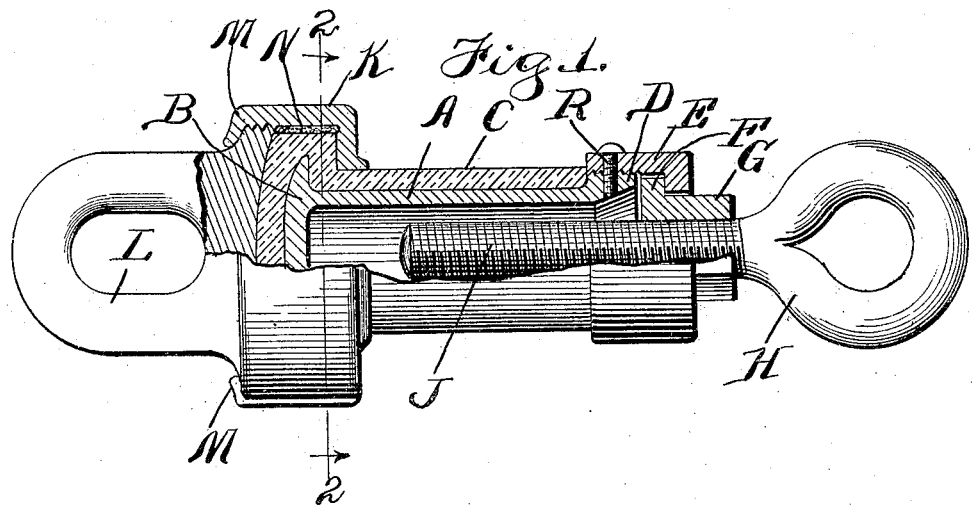
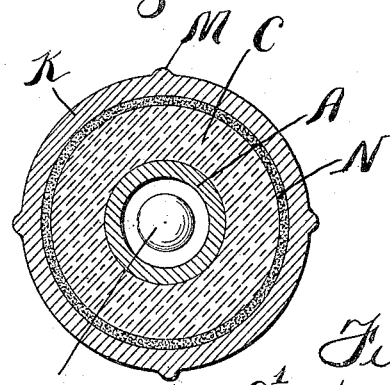
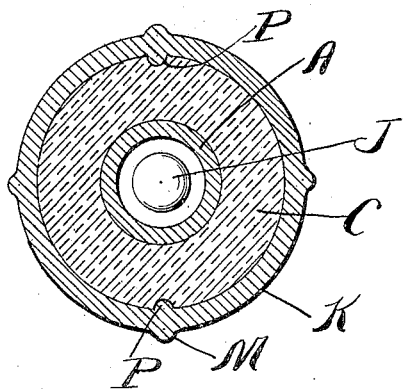
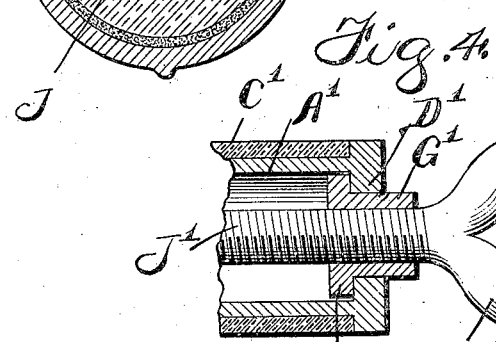
Witnesses
J. B. Weir
Ira P. Perry
Inventor:
George A. Mead
By Brown & Darby
Attys

UNITED STATES PATENT OFFICE.

GEORGE A. MEAD, OF MANSFIELD, OHIO.

STRAIN-INSULATOR.

No. 834,392.　　　　Specification of Letters Patent.　　　Patented Oct. 30, 1906.

Application filed April 22, 1905. Serial No. 256,920.

*To all whom it may concern:*

Be it known that I, GEORGE A. MEAD, a citizen of the United States, residing at Mansfield, in the county of Richland and State of Ohio, have invented a new and useful Improvement in Strain-Insulators, of which the following is a specification.

This invention relates to strain-insulators.

The object of the invention is to provide a construction of strain-insulator for use in insulating large conductors from other conductors or the ground and which is simple in construction, economical, strong, and durable.

The invention consists substantially in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view, partly in side elevation and partly in longitudinal section, showing a construction of strain-insulator embodying the principles of my invention. Fig. 2 is a transverse section on the line 2 2, Fig. 1, looking in the direction of the arrows. Fig. 3 is a view similar to Fig. 2, showing a slightly-modified arrangement embraced within the spirit and scope of my invention. Fig. 4 is a view in section, parts broken off, showing a modified construction embraced within the spirit and scope of my invention.

The same part is designated by the same reference-sign wherever it occurs throughout the several views.

Reference-sign A designates a bolt or sleeve open at one end and provided with a flanged head B at the other end. The shank portion of bolt A, as well as the head portion B thereof, is inclosed within insulating material, (indicated by reference-sign C,) the end of the shank portion of bolt A extending beyond the end of the insulation and being exteriorly threaded, as indicated at D.

E designates a flanged cap adapted to be screwed upon the threaded end or portion D of bolt A and forming a retainer for the circular flange F of a nut G, thereby permitting the nut to rotate axially while being retained in place.

H designates the eye of an eyebolt, the shank J of which is threaded longitudinally through the nut G, said shank extending into the interior of the body A.

K designates a flanged cap interiorly screw-threaded and adapted to be sleeved onto the body and project over the head B of body A and its inclosing insulation, as clearly shown, and into the threaded portion of which is screwed the base of an eyepiece L, lips M serving to maintain the cap K and the eye L in place. The body A and its surrounding insulation C may be held from axial rotation within or relative to the cap K in any suitable or convenient manner—as, for instance, by surrounding the enlarged head of insulating material in the space between the peripheral surface of such head and cap K with a sulfur composition, as indicated at N. (See Figs. 1 and 2.) The same result may be attained in many other specifically different ways. For instance, as shown in Fig. 3, interlocking ribs and seats (indicated at P) may be formed in the interior surface of cap K and the exterior surface of the enlarged head of insulating material C. The particular means employed are unimportant, the important feature being that relative rotative movement of cap K and body or bolt A and its surrounding insulation is prevented.

The operation is as follows: The supporting and the supported conductors are strung through the eyes L and H. Then by applying a suitable wrench or other tool to the nut G and turning said nut the eye H is drawn into or caused to recede out of the body or bolt A, thereby causing the eyes to approach or recede from each other as may be necessary for producing the requisite strain on the span-wire or other connections to which the eyes may be secured. If desired, and in order to prevent the cap E from working loose, a set-screw R may be employed and adapted to be tapped through cap E and into the body A, as clearly shown in Fig. 1.

In Fig. 4 I have shown a modified arrangement wherein the threaded shank J' of eyebolt H' is threaded through a nut G', the flange F' of which is cast within the interior of the body A', the latter being formed with the shoulder D' at its end or being cast around the flanged nut G', the body of said bolt A' being inclosed within insulating material C'. In other respects the structure may be the same as that above described with reference to Fig. 1. By applying a wrench or other suitable tool to the nut G' and turning the same in one direction or the other the shank J' of eyebolt H' is drawn into or is caused to be withdrawn out of the body A'. In the construction shown in Fig. 4 I avoid the provision of the removable screw-cap E, (shown in Fig. 1;) but the structure shown in Fig. 4 necessitates casting the body part A' around the flanged nut G'.

A strain-insulator embodying the principles of construction above described is simple and efficient, as well as economical in manufacture, strong and durable, and wherein the body A and its surrounding insulating material are held or locked against rotative movement within the supporting or securing cap K.

Having now set forth the object and nature of my invention, and various structures embodying the principles thereof, what I claim as new and useful and of my own invention, and desire to secure by Letters Patent, is—

1. A strain-insulator having an insulated body, a flanged cap applied to one end of said body, said cap being interiorly threaded, an eye threaded into said cap, means for preventing displacement of the eye, means for preventing relative rotative movement of said cap and body, an eyebolt having a threaded shank extending into said body, a nut applied to said shank, and means operatively related to the body and engaging the nut for rotatably securing the same in position.

2. A strain-insulator comprising an insulated tubular body provided with a head at one end, a cap surrounding the body and inclosing the head, means disposed between the body and cap to prevent rotation of the latter with respect to the body, said cap being provided with interior threads, an eyepiece engaging the headed end of the body and provided with threads adapted to engage the threads in the cap, means integral with the cap adapted to prevent displacement of the eye, the other end of the body being provided with peripheral threads, a flanged nut adjacent the end of the body, a collar engaging the threads upon the free end of the body and through which the nut is swiveled, and an eyebolt having a threaded shank passing through the nut and into the tubular body.

3. A strain-insulator having an insulated body, a flanged cap applied to one end of the body, said cap being interiorly threaded, means for preventing relative rotary movement of the cap and body, an eye, said eye being provided with a base, said base being exteriorly threaded and adapted to be screwed into the cap, means on said cap adapted to be bent behind the base and within the path of its rearward movement to prevent displacement of the eye, an eyebolt having a threaded shank extending into the body, a nut engaging said shank, and means operatively related to the body and engaging the nut for rotatively securing the same in position.

In witness whereof I have hereunto set my hand, this 19th day of April, 1905, in the presence of the subscribing witnesses.

GEORGE A. MEAD.

Witnesses:
F. W. MILLER,
J. A. NICHOLS.